Aug. 10, 1965 Z. J. J. STEKLY ETAL 3,200,368

SUPERCONDUCTIVE CONNECTOR

Filed April 5, 1963

ZDENEK J.J. STEKLY
ETHAN D. HOAG
*INVENTOR.*

BY Alden D. Redfield
Melvin E. Frederick
ATTORNEYS 3,200,368
SUPERCONDUCTIVE CONNECTOR
Zdenek J. J. Stekly, Topsfield, and Ethan D. Hoag, Watertown, Mass., assignors to Avco Corporation, Cincinnati, Ohio, a corporation of Delaware
Filed Apr. 5, 1963, Ser. No. 270,925
5 Claims. (Cl. 339—265)

The present invention relates to electrical connectors and more particularly to connectors for superconductive wires.

In making a connection between two superconductive wires or a superconductive wire and a normal conductor, welding or brazing is not satisfactory because the temperatures required for welding or brazing adversely affect the superconductive characteristics of many, if not all, superconductive materials. Further, it is difficult to obtain satisfactory connections by electroplating because of the difficulty of electroplating on superconductive materials such as, for example, the niobium-zirconium alloys.

Twisting of present-day superconductive wires with or without the application of pressure is also unsatisfactory because only discrete pressure points are provided which may not provide the necessary amount of contact area for many applications. Further, present-day superconductive materials are quite brittle and therefore cannot be twisted as conveniently or as satisfactorily as the conventional or more ductile electrical conductors such as copper wires and the like.

In accordance with the present invention, a relatively large mass of superconductive material is embedded in one surface of a generally rectangular-prismatic electrically conductive main body member which remains normal at all times. A surface of the superconductive mass is co-planar with the aforementioned surface of the main body member and is provided with an elongated groove to receive two superconductive wires having preferably equal diameters. The width and depth dimensions of the groove are such that one of two superconductive wires will project slightly above the exposed edges of the groove. A rigid cover plate is provided for attachment to the main body member and covers the aforementioned groove. The cover plate is attached to the main body member as by screws or the like, and functions to increase the mechanical contact between the wires themselves and between the wires and the superconductive mass thereby insuring continuous contact between each wire in the groove and between each wire and the superconductive mass along the entire length of the groove.

By reason of the relation between the size of the groove and the diameter of the superconductive wires, a connector in accordance with the present invention provides maximum and continuous contact between the wires in the groove and between each wire and the superconductive mass. Additionally, a single connector may be used to connect two superconductive wires or one superconductive wire and a normal conductor.

Accordingly, it is an object of the present invention to provide a connector for superconductive wires.

It is another object of the present invention to provide a connector for connecting a superconductive wire to a normal conductor.

A still further object of the present invention is to provide a multiple purpose connector for connecting superconducting wires. The novel features that are characteristic of the invention are set forth in the appended claims; the invention itself, however, both as to its organization and method of operation, together with additional objects and advantages thereof, will best be understood from the following description of the brief embodiment when read in conjunction with the accompanying drawings, in which:

Figure 1:
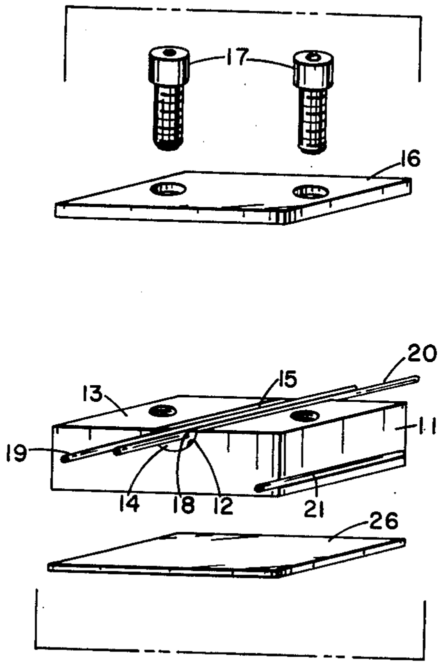
FIGURE 1 is an exploded view of the preferred embodiment of the invention.

With reference now to FIGURE 1, there is shown rectangular-prismatic main body member 11 comprised of a low resistance material such as, for example, copper. A recess 12 is provided in and across a major surface 13 of the main body member as by milling or drilling to receive a mass of superconductive material 14. The mass of superconductive material 14 is adapted for a force fit in the recess 12 and is provided with a major surface 15 co-planar with the aforementioned major surface 13 of the main body member 11. A flat and rigid cover plate 16 such as, for example, stainless steel, is adapted for abutting engagement with the major surfaces 13 and 15 of both the main body member and the superconductive material embedded in the main body member. The cover plate 16 is attached to the main body member 11 as by screws 17 or the like. Insulation 26 may be attached in any suitable manner to the block 11.

Figure 2:
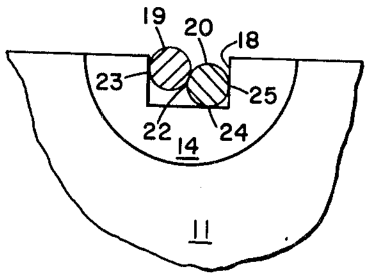
FIGURE 2 is a fragmentary end view on an enlarged scale of a portion of the connector.

The major surface 15 of the superconductive material 14 is provided with a rectangular groove 18 to receive two superconductive wires 19 and 20 of preferably the same diameter or, alternately, two different portions of the same wire. The groove 18 extends the entire length of the superconductive material 14. The width of the groove 18 is slightly less than the combined diameter of both wires and the depth of the groove is slightly more than one half the combined diameters of both wires whereby when both wires 19 and 20 are disposed in the groove 18, a portion of one wire will project slightly above and along the entire length of the major surface 15 of the superconductive material 14. Accordingly, when the cover plate is brought into engagement with the exposed portion of the upper superconductive wire, such as, for example, wire 19 as shown in FIGURE 2, this wire will be forced in a wedging action into intimate contact with the lower superconducting wire 20 along one continuous line 22 and also into intimate contact with the superconductive material 14 along another continuous line 23. Because of the wedging action of the upper superconducting wire 19, the lower superconducting wire 20 will also be forced into intimate contact along two continuous lines 24 and 25 with the superconductive material 14. The length of the groove 18 should be greater by a factor of at least ten than its depth. A normal conductor 21 may be electricaly connected to the main body member at any suitable point.

For optimum efficiency, a connector in accordance with the present invention should be provided for each diameter or a limited range of diameters of superconductive wire with which it is to be used so that the dimensions of groove 18 are always such that pressure applied to the upper wire in the groove will exert a wedging action on both wires. Accordingly, the connector may be easily and quickly assembled or disassembled, used to connect two separate and distinct superconducting wires of the same diameter as shown in FIGURE 1, used to connect one superconducting wire (by bending it double and placing the doubled portion in the groove 18) and a normal conductor electrically connected to the main body portion as by soldering or the like, or connecting a normal conductor at the point of junction of two superconducting wires as is also shown in FIGURE 1.

The mass of the superconductive material 14 functions to provide the maximum area for current flow in the connector.

The various features and advantages of the invention are thought to be clear from the foregoing description. Various other features and advantages not specifically enumerated will undoubtedly occur to those versed in the art, as likewise will many variations and modifications of the embodiment of the invention illustrated, all of which may be achieved without departing from the spirit and scope of the invention as defined by the following claims.

We claim:

1. A connector for superconductive wires having a predetermined diameter comprising:

(a) a generally rectangular electrically conductive main body member having a first flat surface and an elongated recess in and extending across said flat surface, said member being normal at all times;

(b) a mass of superconductive material disposed in said recess and having a second flat surface, said second flat surface having a straight, rectangular, and elongated groove adapted to receive two superconductive wires having predetermined diameters, said groove having a width slightly less than the combined diameters of said wires and a depth slightly greater than one half the combined diameters of said wires whereby a portion of one of said wires will project along the length of and slightly above said first surface when said wires are disposed in said groove;

(c) a rigid cover plate; and (d) means for attaching said cover plate to said main body member to exert pressure on said wires along the length of said groove when said wires are disposed in said groove.

2. A connector for superconductive wires having predetermined and equal diameters comprising:

(a) a generally rectangular-prismatic electrically conductive main body member having a first major surface and an elongated recess in and extending across said major surface, said member remaining normal at all times;

(b) a mass of superconductive material disposed in a force fit in said recess and having a second major surface co-planar with said first major surface, said second major surface having a straight, rectangular, and elongated groove extending the length of said superconductive material adapted to receive two superconductive wires of equal diameter, said superconductive material being in intimate contact with said main body over an area considerably greater than the area delineated by said groove, said groove having a width slightly less than the combined diameters of said wires and a depth slightly greater than one half the combined diameters of said wires whereby a portion of one of said wires will project slightly above and along the length of said first surface when said wires are disposed in said groove;

(c) a rigid cover plate; and (d) means for attaching said cover plate to said main body member to contact the said portion of one of said wires that projects above the said first surface and thereby exert pressure on said wires when disposed in said groove.

3. A connector for superconductive wires comprising:

(a) a generally rectangular, electrically conductive and non-superconducting main body member having a first flat surface and an elongated recess in said first flat surface;

(b) first and second portions of at least one superconductive wire having predetermined diameters;

(c) superconductive material embedded in said recess and having a second flat surface, said second flat surface having an elongated groove adapted to receive said first and second portions, said groove having a width greater than the largest diameter of said portions and a depth requiring that a part of one of said portions projects slightly above and along the length of said second surface when both said portions are disposed in said groove and;

(d) means for exerting pressure on said portions in the direction of said second surface when said portions are disposed in said groove.

4. A connector for superconductive wires comprising:

(a) a generally rectangular, electrically conductive and non-superconducting main body member having a first flat surface and an elongated recess in and extending across said first flat surface;

(b) first and second portions of at least one superconductive wire, said portions having predetermined diameters;

(c) superconductive material embedded in said recess and having a second flat surface, said second flat surface having an elongated and rectangular groove adapted to receive said first and second portions, said superconducting material being in intimate contact with said main body member over an area considerably greater than the area delineated by said groove, said groove having a width greater than the largest diameter of said portions and a depth requiring that a part of one of said portions projects slightly above and along the length of said second flat surface when said portions are disposed in said groove; and (d) means for exerting pressure on said portions along the length of said groove in the direction of said second surface when both said portions are disposed in said groove.

5. A connector for superconductive wires comprising:

(a) a generally rectangular, electrically conductive and non-superconducting main body member having a first flat surface and an elongated recess in and extending across said first flat surface;

(b) first and second portions of at least one superconductive wire, said portions having predetermined diameters;

(c) a mass of superconductive material embedded in said recess and having a second flat surface, said second flat surface having an elongated and rectangular groove adapted to receive said first and second portions, said superconductive material being in intimate contact in said main body member over an area considerably greater than the area delineated by said groove, said groove having a width greater than the largest diameter of said portions and a depth requiring that a part of one of said portions will project slightly above and along the length of said first surface when said portions are disposed in said groove;

(d) a rigid cover plate, and;

(e) means for attaching said cover plate to said main body member to exert pressure on said portions along the length of said groove when said wires are disposed in said groove.

References Cited by the Examiner

UNITED STATES PATENTS

| | | | |
|---|---|---|---|
| 1,248,528 | 12/17 | Nagel | 339—265 |
| 2,327,048 | 8/43 | Joyce. | |
| 2,658,133 | 11/53 | Barrow | 339—265 XR |
| 2,795,770 | 6/57 | Toedtman | 339—278 |
| 3,048,707 | 8/62 | Nyberg | 338—32 XR |

FOREIGN PATENTS

| | | |
|---|---|---|
| 477,880 | 2/53 | Italy. |
| 209,399 | 6/60 | Austria. |

JOSEPH D. SEERS, *Primary Examiner.*

THOMAS J. HICKEY, *Examiner.*